United States Patent
Lu

(10) Patent No.: US 11,362,845 B2
(45) Date of Patent: Jun. 14, 2022

(54) SECURE COMMUNICATION BETWEEN SERVER DEVICE AND CLIENTS UTILIZING STRONG PHYSICAL UNCLONABLE FUNCTIONS

(71) Applicant: TAIWAN SEMICONDUCTOR MANUFACTURING CO., LTD., Hsinchu (TW)

(72) Inventor: Shih-Lien Linus Lu, Hsinchu (TW)

(73) Assignee: Taiwan Semiconductor Manufacturing Co., Ltd.

( * ) Notice: Subject to any disclaimer, the term of this patent is extended or adjusted under 35 U.S.C. 154(b) by 909 days.

(21) Appl. No.: 15/441,788

(22) Filed: Feb. 24, 2017

(65) Prior Publication Data

US 2018/0152306 A1    May 31, 2018

Related U.S. Application Data

(60) Provisional application No. 62/428,094, filed on Nov. 30, 2016.

(51) Int. Cl.
| | |
|---|---|
| *H04L 29/06* | (2006.01) |
| *G06F 21/00* | (2013.01) |
| *H04L 9/32* | (2006.01) |
| *G09C 1/00* | (2006.01) |
| *G06F 21/72* | (2013.01) |

(52) U.S. Cl.
CPC ............ *H04L 9/3278* (2013.01); *G06F 21/72* (2013.01); *G09C 1/00* (2013.01); *H04L 2209/12* (2013.01)

(58) Field of Classification Search
CPC ....... H04L 9/3278; H04L 9/0861; H04L 9/32; H04L 9/08; G06F 21/73; G06F 21/72; G06F 21/00
USPC .............................................. 713/168; 726/2
See application file for complete search history.

(56) References Cited

U.S. PATENT DOCUMENTS

| | | | |
|---|---|---|---|
| 6,918,035 | B1 | 7/2005 | Patel |
| 9,369,277 | B2 | 6/2016 | Augustine et al. |
| 2012/0042379 | A1 | 2/2012 | Diehl et al. |
| 2013/0010957 | A1* | 1/2013 | Yu ........................ H04L 9/0866 380/260 |

(Continued)

FOREIGN PATENT DOCUMENTS

| | | |
|---|---|---|
| KR | 10-0593576 | 6/2006 |
| KR | 10-2012-0007013 | 1/2012 |

(Continued)

*Primary Examiner* — Lisa C Lewis
(74) *Attorney, Agent, or Firm* — Sterne, Kessler, Goldstein & Fox P.L.L.C.

(57) ABSTRACT

A client device is fabricated using a semiconductor fabrication process. One or more uncontrollable random physical processes in the semiconductor fabrication process can cause small differences between the client device and other client devices. When the client device is presented with a challenge from a server device, the client device generates a random response that depends on its physical properties. The server device stores this random response as a part of a virtual PUF circuitry storage device having other random responses from the other client devices. The server device uses the random response of the client device stored in the virtual PUF circuitry storage device for one or more encryption algorithms to encrypt information to be provided to the client device.

22 Claims, 7 Drawing Sheets

(56) References Cited

U.S. PATENT DOCUMENTS

| | | | |
|---|---|---|---|
| 2013/0047209 A1* | 2/2013 | Satoh | H04L 9/3278 |
| | | | 726/2 |
| 2014/0068780 A1* | 3/2014 | Kim | G06F 21/88 |
| | | | 726/26 |
| 2015/0058928 A1* | 2/2015 | Guo | H04L 63/08 |
| | | | 726/3 |
| 2015/0070979 A1 | 3/2015 | Zhu et al. | |
| 2015/0188707 A1 | 7/2015 | Gehrer et al. | |
| 2017/0134176 A1 | 5/2017 | Kim et al. | |
| 2018/0131529 A1* | 5/2018 | Cambou | H04L 9/3278 |
| 2018/0145838 A1* | 5/2018 | Wang | H04L 9/3278 |

FOREIGN PATENT DOCUMENTS

| | | |
|---|---|---|
| KR | 101393806 B1 | 5/2014 |
| TW | 201606557 A | 2/2016 |
| TW | 201617966 A | 5/2016 |

\* cited by examiner

SECURE COMMUNICATION BETWEEN SERVER DEVICE AND CLIENTS UTILIZING STRONG PHYSICAL UNCLONABLE FUNCTIONS

CROSS-REFERENCE TO RELATED APPLICATIONS

The present application claims the benefit of U.S. Provisional Patent Appl. No. 62/428,094, filed Nov. 30, 2016, which is incorporated herein by reference in its entirety.

BACKGROUND

An integrated circuit represents a collection of electronic circuits that are formed onto a semiconductor substrate, such as a silicon crystal to provide an example, using a semiconductor fabrication process. Often times, manufacturing variations and/or misalignment tolerances present within the semiconductor fabrication process can cause integrated circuits fabricated by the semiconductor fabrication process to differ from each other. For example, uncontrollable random physical processes in the semiconductor fabrication process can cause small differences, such as differences in doping concentrations, oxide thicknesses, channel lengths, structural widths, and/or parasitics to provide some examples, in the integrated circuits. These small differences are maintained within process limits of the semiconductor fabrication process and usually do not affect the proper functioning of the integrated circuits. However, these small differences cause each of the integrated circuits to be physically unique with no two integrated circuits being identical. Physical unclonable functions (PUFs) use this physical uniqueness to differentiate integrated circuits from each other. The PUFs represent challenge-response mechanisms in which mapping between challenges and their corresponding responses are dependent on the complex and variable nature of the physical material used to fabricate the integrated circuits. When the integrated circuits are presented with the challenges, the integrated circuits generate random responses that depend on the physical properties of the integrated circuits themselves. When queried with the same challenge multiple times, the integrated circuits generate similar responses that differ only by small errors that can be corrected by an appropriate error correction mechanism.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
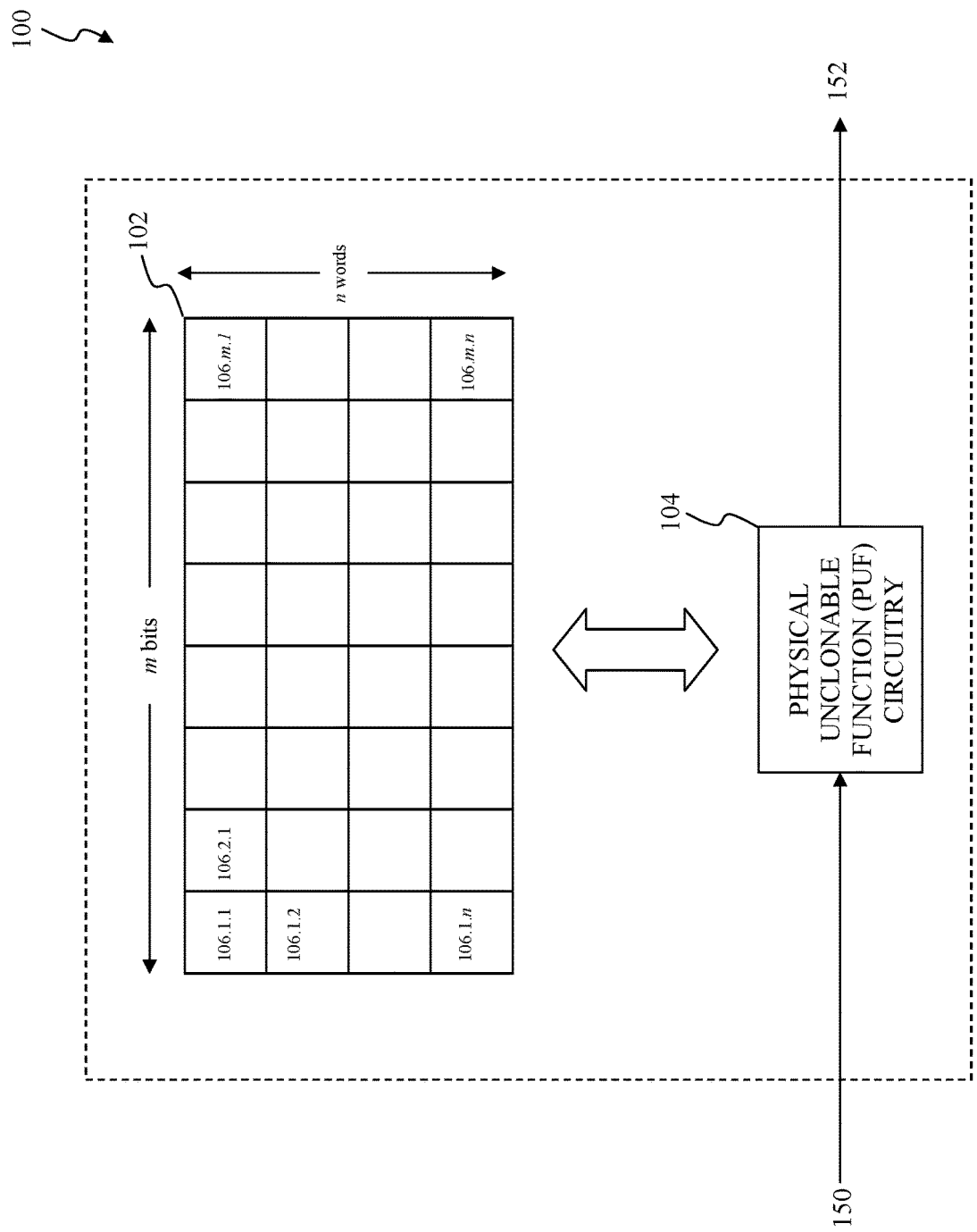
FIG. 1 is a block diagram of physical unclonable function (PUF) circuitry according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is does not in itself dictate a relationship between the various embodiments and/or configurations discussed.

Overview

A client device is fabricated using a semiconductor fabrication process. One or more uncontrollable random physical processes in the semiconductor fabrication process can cause small differences between the client device and other client devices. When the client device is presented with a challenge from a server device, the client device generates a random response that depends on its physical properties. The server device stores this random response as a part of a virtual PUF circuitry storage device having other random responses from the other client devices. The server device uses the random response of the client device stored in the virtual PUF circuitry storage device for one or more encryption algorithms to encrypt information to be provided to the client device.

Exemplary Physical Unclonable Function (PUF) Circuitry

FIG. 1 is a block diagram of physical unclonable function (PUF) circuitry according to an embodiment of the present disclosure. An electronic device 100 can be fabricated using a semiconductor fabrication process. As illustrated in FIG. 1, electronic device 100 can include a memory array 102 of a data storage device. Often times, manufacturing variations and/or misalignment tolerances present within the semiconductor fabrication process can cause memory array 102 to differ from other memory arrays of other electronics circuits similarly designed and fabricated by the semiconductor fabrication. For example, uncontrollable random physical processes in the semiconductor fabrication process can cause small differences, such as differences in doping concentrations, oxide thicknesses, channel lengths, structural widths, and/or parasitics to provide some examples, between these memory arrays. These small differences are maintained within process limits of the semiconductor fabrication process and usually do not affect the proper functioning of these memory arrays. However, these small differences cause each of these memory arrays to be physically unique with no two memory arrays being identical. Physical unclonable functions (PUFs) use this physical uniqueness to differentiate electronic device 100 from other electronic devices similarly designed and fabricated by the semiconductor fabrication. As illustrated in FIG. 1, electronic device 100 includes memory array 102 and PUF circuitry 104.

Memory array 102 includes memory cells 106.1.1 through 106.m.n that are arranged in an array of m columns of m bits and n rows of n words. In this exemplary embodiment, memory cells 106.1.1 through 106.m.n can be implemented using six transistor (6T) static random-access memory (SRAM) cells; however, other implements are possible as will be recognized by those skilled in the relevant art(s) without departing from the spirit and scope of the present disclosure. One or more uncontrollable random physical processes in the semiconductor fabrication process can cause small differences, such as, but not limited to, differences in doping concentrations, oxide thicknesses, channel lengths, structural widths, and/or parasitics between transistors of memory cells 106.1.1 through 106.m.n. For example, each of memory cells 106.1.1 through 106.m.n includes a cross-coupled inverting circuit having a first inverting circuit cross-coupled to a second inverting circuit. In this example, these small differences can cause the first inverting circuit of a first group of memory cells from among the one or more of memory cells 106.1.1 through 106.m.n to have a stronger response than the second inverting circuit of the first group of memory cells. In this situation, the first group of memory cells having this stronger first inverting circuit will store a first logical value, such as a logical one, when the first group of memory cells is operating in an unprogrammed mode of operation, such as when powered-up. Alternatively, or in addition to, these small differences can cause the second inverting circuit of a second group of memory cells from among the one or more of memory cells 106.1.1 through 106.m.n to have a stronger response than the first inverting circuit of the second group of memory cells. In this situation, the second group of memory cells having this stronger second inverting circuit will store a second logical value, such as a logical zero, when the second group of memory cells is operating in the unprogrammed mode of operation.

It can be beneficial for PUF circuitry 104 to store the physical uniqueness of memory cells 106.1.1 through 106.m.n resulting from the one or more uncontrollable random physical processes in the semiconductor fabrication process to implement a physical unclonable function (PUF) to allow electronic device 100 to be differentiated from other electronic devices similarly designed and fabricated by the semiconductor fabrication. As illustrated in FIG. 1, PUF circuitry 104 communicates with memory array 102 to read one or more bits of information stored in one or more of memory cells 106.1.1 through 106.m.n of memory array 102 when memory cells 106.1.1 through 106.m.n are operating in the unprogrammed mode of operation. Thereafter, PUF circuitry 104 stores the one or more bits of information as one or more listings, one or more tables, one or more files, one or more databases, and/or any other storage type that will be apparent to those skilled in the relevant art(s) without departing from the spirit and scope of the present disclosure. In an exemplary embodiment, PUF circuitry 104 uses the one or more bits of information to implement a "strong" PUF. The "strong" PUF refers to a PUF having a complex challenge-response behavior with many possible challenges whereas a "weak" PUF refers to a PUF having very few challenges. The "weak" PUF may include only one, fixed challenge in the extreme case.

PUF circuitry 104 designates various groupings of the one or more bits of information to various responses and assigns these various responses to various challenges. In some situations, PUF circuitry 104 stores these responses along with their corresponding challenges as challenge-response pairs. Because of the uncontrollable random physical processes of the semiconductor fabrication process in fabricating memory cells 106.1.1 through 106.m.n, the challenge-response pairs stored in PUF circuitry 104 are different from other challenge-response pairs of other PUF circuitry of other electronic devices that are similarly fabricated using the semiconductor fabrication process. As a result, the challenge-response pair can be used to differentiate electronic device 100 from other electronic devices similarly designed and fabricated using the semiconductor fabrication process. For example, as illustrated in FIG. 1, PUF circuitry 104 provides a response 152 that corresponds to challenge 150. In some situations, PUF circuitry 104 retrieves a challenge-response pair which corresponds to challenge 150. In these situations, PUF circuitry 104 provides the response of this challenge-response pair which corresponds to challenge 150 as response 152. Because of the uncontrollable random physical processes of the semiconductor fabrication process in fabricating memory cells 106.1.1 through 106.m.n, the response 152 that corresponds to challenge 150 is different from other responses from other electronic devices that are similarly designed and fabricated using the semiconductor fabrication process when these other electronic devices are presented with a similar challenge 150.

Communication Using PUFS

Figure 2:
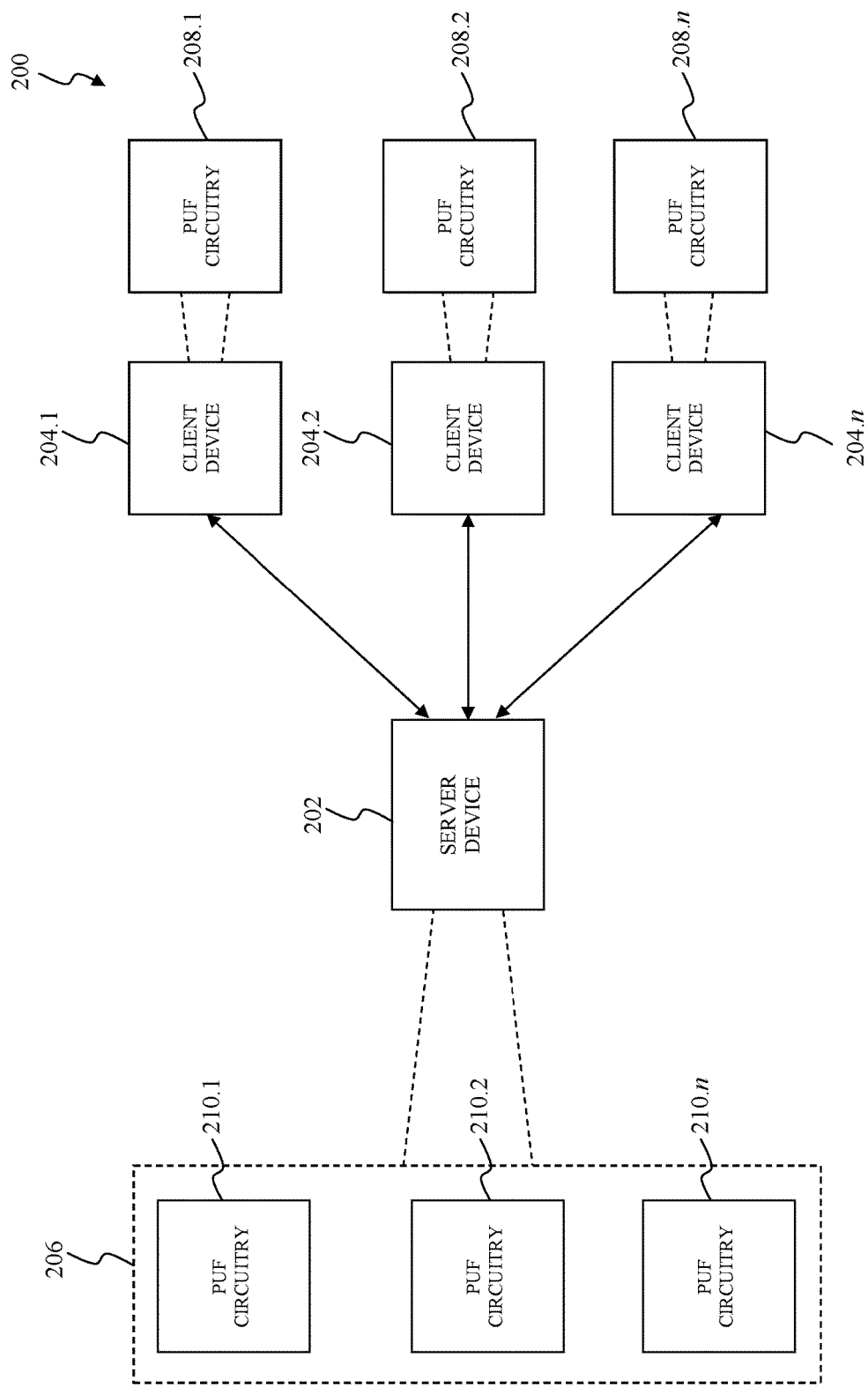
FIG. 2 is a block diagram of an exemplary client-server device communication system according to an embodiment of the present disclosure.

FIG. 2 is a block diagram of an exemplary client-server device communication system in accordance with an embodiment of the present disclosure. A client-server device communication system 200 represents a distributed application structure that partitions one or more tasks or workloads between a provider of a resource or service, referred to as a server device 202, and one or more service requesters, referred to as client devices 204.1 through 204.n. In an exemplary embodiment, client-server device communication system 200 can represent an intra-device communication system, such as between a processor and a memory for example, in which server device 202 and client devices 204.1 through 204.n are formed on one or more chips and/or dice within a single package. In another exemplary embodiment, client-server device communication system 200 can represent an inter-device communication system in which server device 202 and client devices 204.1 through 204.n are within multiple packages separated by one or more communication channels, such as, for example one or more wired communication channels and/or one or more wireless communication channels. In this other exemplary embodiment, client devices 204.1 through 204.n represent one or more personal computers, data terminal equipment, one or more telephony devices, such as one or more mobile phones or one or more mobile computing devices to provide some examples, one or more broadband media players, one or more network controlled appliances, one or more set-top boxes, and/or other devices that are capable of transmitting and/or receiving video, audio, and/or data that will be apparent to those skilled in the relevant art(s).

In the exemplary embodiment of FIG. 2, client-server device communication system 200 is implemented as a bi-directional communication system allowing for communication of encrypted information, such as, for example, video, audio, and/or data, between server device 202 and client devices 204.1 through 204.*n*. As shown in FIG. 2, client devices 204.1 through 204.*n* include corresponding PUF circuitry, such as, for example, PUF circuitry 104, from among PUF circuitry 208.1 through 208.*n*. Although client devices 204.1 through 204.*n* can be fabricated using the same semiconductor fabrication process, uncontrollable random physical processes of the semiconductor fabrication process can cause small differences, such as, for example, differences in doping concentrations, oxide thicknesses, channel lengths, structural widths, and/or parasitics, between the client devices 204.1 through 204.*n*. The physical uniqueness of PUF circuitry 208.1 through 208.*n* resulting from the one or more uncontrollable random physical processes in the semiconductor fabrication process can be used to implement physical unclonable functions (PUFs) to allow server device 202 to differentiate between client devices 204.1 through 204.*n*. For example, in a similar manner as discussed in FIG. 1 above, client devices 204.1 through 204.*n* provide unique responses in response to a challenge provided by server device 202. As discussed below, server device 202 and/or client devices 204.1 through 204.*n* can use these responses to encrypt and/or decrypt information.

Server device 202 includes a virtual mapping of the responses of PUF circuitry 208.1 through 208.*n* to various challenges. Before encrypted communication among server device 202 and client devices 204.1 through 204.*n* can occur, client devices 204.1 through 204.*n* undergo a registration process to register their corresponding PUF circuitry 208.1 through 208.*n* with server device 202. As part of this registration process, server device 202 provides a challenge to one or more of client devices 204.1 through 204.*n*. In an exemplary embodiment, the challenge can represent a request to access one or more challenge-response pairs from among challenge-response pairs stored in PUF circuitry 208.1 through 208.*n*. When the one or more client devices 204.1 through 204.*n* are presented with this challenge, their corresponding PUF circuitry 208.1 through 208.*n* generate random responses that depend on the physical properties of PUF circuitry 208.1 through 208.*n* themselves. Thereafter, server device 202 catalogs these responses to virtually map PUF circuitry 208.1 through 208.*n*. As shown in FIG. 2, server device 202 can store these responses in virtual PUF circuitry storage device 206 as one or more listings, one or more tables, one or more files, one or more databases, and/or any other well-known storage type that will be apparent to those skilled in the relevant art(s) without departing from the spirit and scope of the present disclosure. In some situations, server device 202 stores these responses along with their corresponding challenges as challenge-response pairs in virtual PUF circuitry storage device 206. In the exemplary embodiment of FIG. 2, virtual PUF circuitry storage device 206 can be partitioned into virtual PUF circuitry 210.1 through 210.*n* corresponding to PUF circuitry 208.1 through 208.*n*.

During operation, server device 202 queries virtual PUF circuitry storage device 206 with a random, or pseudo-random, challenge to access one or more responses from among virtual PUF circuitry 210.1 through 210.*n* that corresponds to a first client device, such as client device 204.1, client device 204.2, or client device 204.*n* to provide some examples, from among the one or more client devices 204.1 through 204.*n*. This challenge to virtual PUF circuitry storage device 206 may represent a query to virtual PUF circuitry storage device 206 for the one or more responses, or a portion thereof, from virtual PUF circuitry 210.1 through 210.*n* which corresponds to the first client device. Thereafter, virtual PUF circuitry storage device 206 responds to the challenge with a response that corresponds to the unique response, or a portion thereof, of the first client device stored in virtual PUF circuitry 210.1 through 210.*n* which corresponds to the first client device. Next, server device 202 uses the response provided by virtual PUF circuitry storage device 206 for one or more encryption algorithms to encrypt information to be provided to the first client device. The one or more encryption algorithms can include an asymmetric encryption algorithm, a cryptographic hash function, a pseudo-random number generator, a key exchange algorithm, a key derivation function, a secret sharing algorithm, a symmetric encryption, and/or any other suitable encryption algorithm or combinations of encryption algorithms that will be apparent to those skilled in the relevant art(s) without departing from the spirit and scope of the present disclosure. For example, server device 202 uses the response provided by virtual PUF circuitry storage device 206 as a seed for the one or more encryption algorithms. Subsequently, server device 202 provides the encrypted information and the challenge provided to virtual PUF circuitry storage device 206 to the first client device.

After receiving the encrypted information and the challenge from server device 202, the first client device queries its corresponding PUF circuitry from among PUF circuitry 208.1 through 208.*n* using the challenge received from server device 202. Thereafter, this PUF circuitry responds to the challenge received from server device 202 with a response that matches the response of virtual PUF circuitry storage device 206 allowing the first client device to decrypt the encrypted information received from server device 202. Next, the first client device uses this response provided by its PUF circuitry for one or more decryption algorithms to decrypt the encrypted information received from server device 202. The one or more decryption algorithms can include an asymmetric encryption algorithm, a cryptographic hash function, a pseudo-random number generator, a key exchange algorithm, a key derivation function, a secret sharing algorithm, a symmetric encryption, and/or any other suitable decryption algorithm or combinations of decryption algorithms that will be apparent to those skilled in the relevant art(s) without departing from the spirit and scope of the present disclosure.

The encryption/decryption process as described above prevents unauthorized access to the encrypted information sent from server device 202 to the first client device. As described above, PUF circuitry 208.1 through 208.*n* include small differences, such as differences in doping concentrations, oxide thicknesses, channel lengths, structural widths, and/or parasitics to provide some examples, between each other. As such, if an unauthorized, second client device from among the one or more client devices 204.1 through 204.*n* were to query its corresponding PUF circuitry from among PUF circuitry 208.1 through 208.*n* with the challenge received from server device 202 that corresponds to the first client device, the response provided by its corresponding PUF circuitry would differ from the response of virtual PUF circuitry storage device 206. As such, the second client device would be unable to decrypt the information received from server device 202 if the second client device were to use the response of its corresponding PUF circuitry to the challenge received from server device 202.

Exemplary Encrypting Processor

Figure 3:
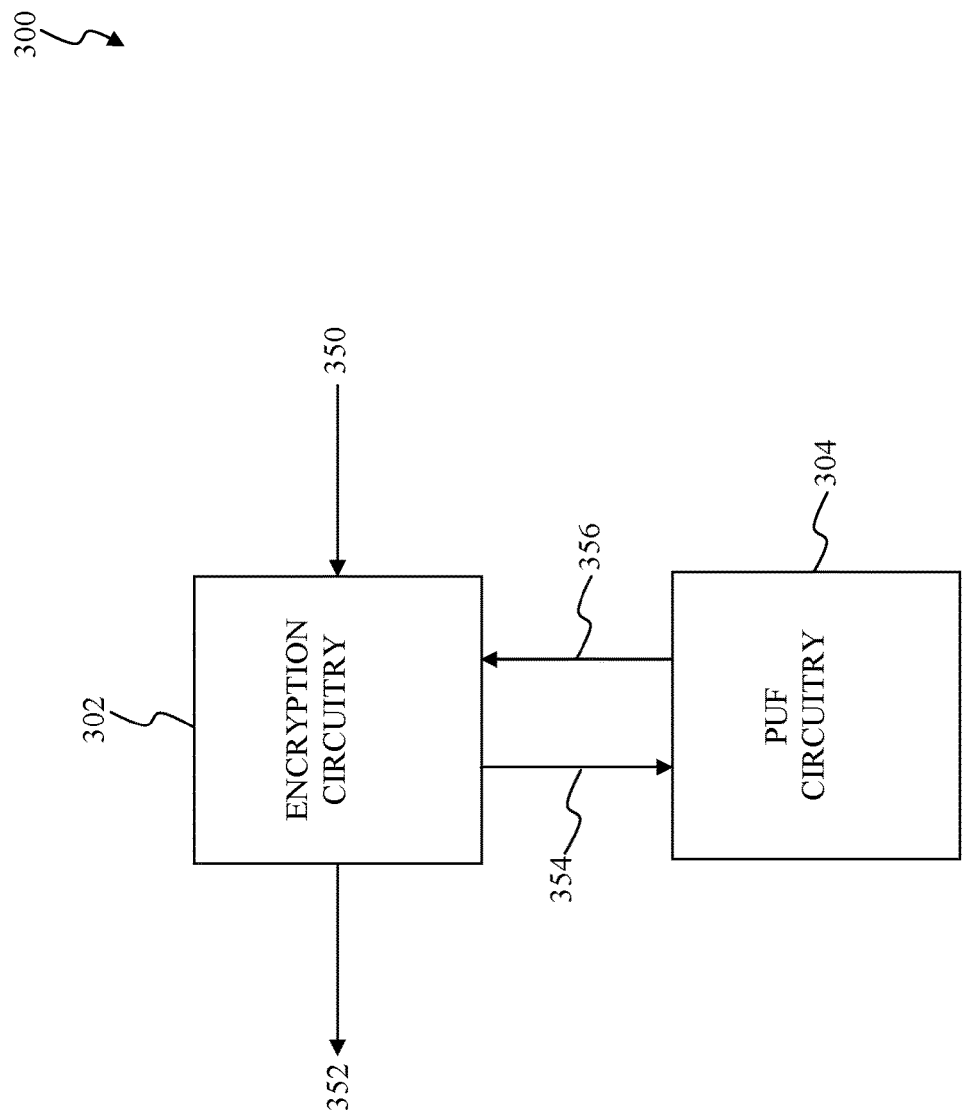
FIG. 3 is a block diagram of an exemplary encrypting processor that can be implemented within the exemplary client-server device communication system according to an embodiment of the present disclosure.

FIG. 3 is a block diagram of an exemplary encrypting processor that can be implemented within the exemplary client-server device communication system in accordance with an embodiment of the present disclosure. An encrypting processor 300 encrypts information 350 in accordance with any of the one or more encryption algorithms as discussed above in FIG. 1 to provide encrypted information 352. Encrypting processor 300 can be implemented within a server device, such as, for example, server device 202, and/or a client device, such as, for example, one or more of client devices 204.1 through 204.$n$. In the exemplary embodiment illustrated in FIG. 3, encrypting processor 300 includes encryption circuitry 302 and a PUF circuitry 304.

As illustrated in FIG. 3, encryption circuitry 302 queries PUF circuitry 304 with a challenge 354 and receives a response 356 in response to the challenge 354. When the encrypting processor 300 is implemented within the client device, the PUF circuitry 304 generates the response 356 that represents a unique response of the client device that is dependent on the physical properties of the client device in response to challenge 354. Otherwise when encrypting processor 300 is implemented within the server device, PUF circuitry 304 provides a virtual mapping of one or more PUF circuitry, or portions thereof, of a client device from among client devices registered with the server device, such as, for example, one or more of PUF circuitry 208.1 through 208.$n$ of client devices 204.1 through 204.$n$, as response 356. Thereafter, encryption circuitry 302 uses response 356 for one or more of the encryption algorithms to encrypt information 350 to provide encrypted information 352.

In an exemplary embodiment, PUF circuitry 304 can represent an exemplary embodiment of one or more of PUF circuitry 208.1 through 208.$n$ when encrypting processor 300 is implemented within the client device. Alternatively, or additionally, PUF circuitry 304 represents a virtual mapping of the responses of the client devices registered with the server device to various challenges when encrypting processor 300 is implemented within the server device. In another exemplary embodiment, PUF circuitry 304 can include a storage medium such as a volatile memory, such as random access memory (RAM), and/or non-volatile memory, such as read-only memory (ROM). The RAM can be implemented in dynamic random-access memory (DRAM), a static random-access memory (SRAM), and/or a non-volatile memory (NVM) configuration to provide some examples. PUF circuitry 304 can store these responses as one or more listings, one or more tables, one or more files, one or more databases, and/or any other well-known storage type that will be apparent to those skilled in the relevant art(s) without departing from the spirit and scope of the present disclosure. In some situations, PUF circuitry 304 stores these responses along with their corresponding challenges as challenge-response pairs. In another exemplary embodiment, PUF circuitry 304 can represent an exemplary embodiment of virtual PUF circuitry storage device 206 when encrypting processor 300 is implemented within the server device.

Figure 4:
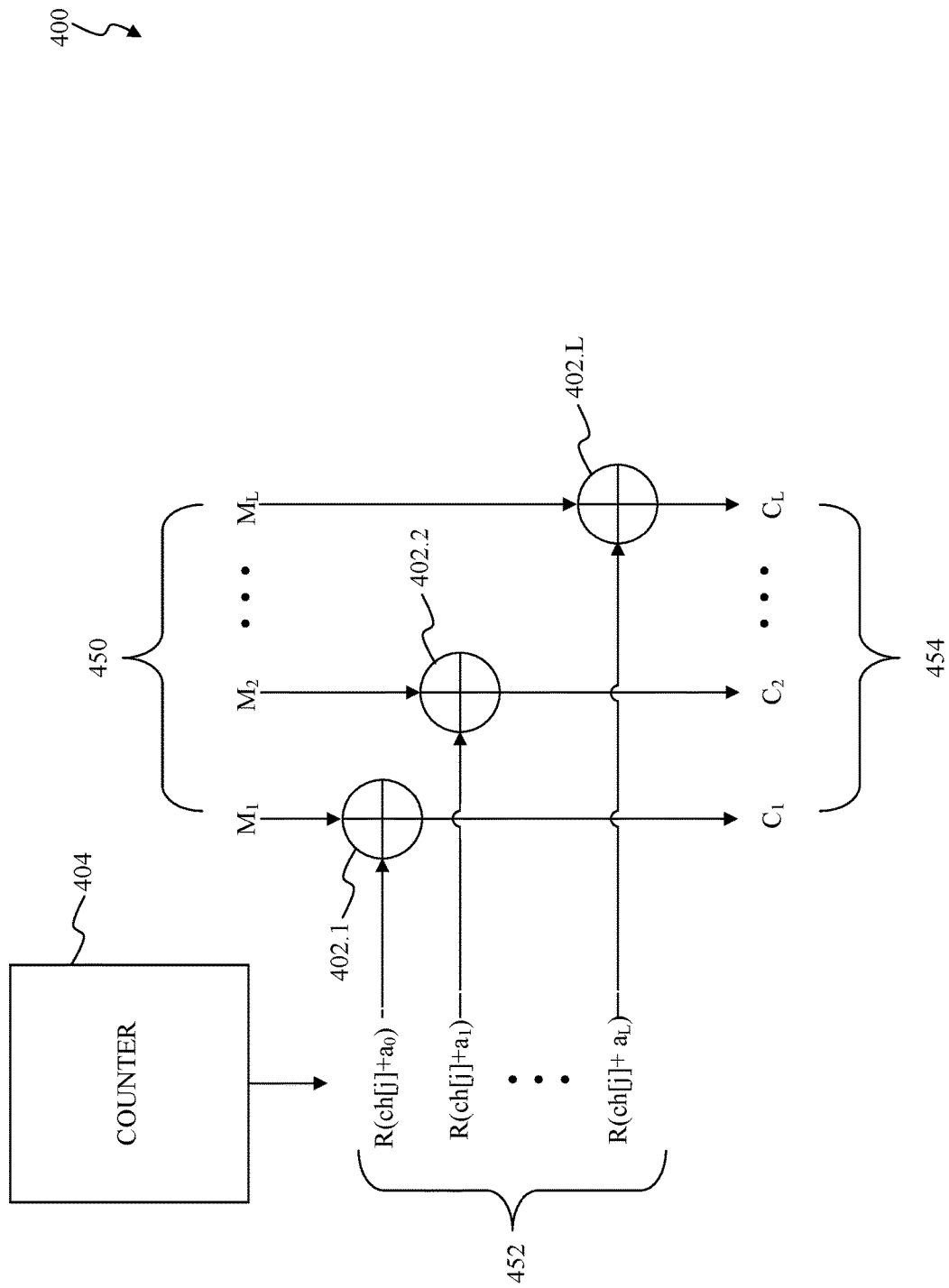
FIG. 4 is a block diagram of exemplary encrypting processing circuitry that can be implemented within the exemplary encrypting processor according to an embodiment of the present disclosure.

Exemplary Encrypting Processing Circuitry that can be Implemented within the Encrypting Processor FIG. 4 is a block diagram of exemplary encrypting processing circuitry that can be implemented within the exemplary encrypting processor in accordance with an embodiment of the present disclosure. Encrypting processing circuitry 400 encrypts information 450 utilizing responses 452 to provide encrypted information 454. As illustrated in FIG. 4, encrypting processing circuitry 400 includes logical exclusive OR gates 402.1 through 402.L and counting circuitry 404. Encrypting processing circuitry 400 can represent an exemplary embodiment of encryption circuitry 302.

In the exemplary embodiment of FIG. 4, information 450 can include a serial stream of video, audio, and/or data. As shown in FIG. 4, this serial stream of video, audio, and/or data can be logically separated into messages $M_1$ through $M_L$. The messages $M_1$ through $M_L$ can include a similar or a different number of bits and/or bytes, also referred to as bit-length.

The logical exclusive OR gates 402.1 through 402.L perform a logical exclusive OR operation between the messages $M_1$ through $M_L$ and responses 452 to provide the encrypted information 454. However, those skilled in the relevant art(s) will recognize that encrypting processing circuitry 400 and/or decrypting processing circuitry 600, which is to be discussed in further detail below, can be implemented using one or more other logical gates, such as logical exclusive NOR gates to provide an example, without departing from the spirit and scope of the present disclosure. Generally speaking, these one or more logical gates are characterized as having a substantially equal probability to provide a first logical value, such as a logical one, or a second logical value, such as a logical zero, As illustrated in FIG. 4, responses 452 include responses $R(ch[j]+a_0)$ through $R(ch[j]+a_L)$. In an exemplary embodiment, the responses $R(ch[j]+a_0)$ through $R(ch[j]+a_L)$ represent unique responses of a client device, such as for example, one of client devices 204.1 through 204.$n$, that is dependent on the physical properties of the client device as discussed above in response to challenges $ch[j]$ through $ch[j]+a_L$. For example, the response $R(ch[j]+a_0)$ and the response $R(ch[j]+a_L)$ represent a unique response of the client device in response to the challenge $ch[j]+a_0$ and the challenge $ch[j]+a_L$. In another exemplary embodiment, the responses $R(ch[j]+a_0)$ through $R(ch[j]+a_L)$ represent unique responses of a server device stored as a virtual mapping of one or more PUF circuitry, or portions thereof, of a client device from among client devices registered with the server device, such as, for example, one or more of PUF circuitry 208.1 through 208.$n$ of client devices 204.1 through 204.$n$.

During operation, the server device and/or the client device randomly generates the challenge $ch[j]+a_0$ to provide the response $R(ch[j]+a_0)$ having a similar bit-length to the message $M_1$. Thereafter, the server device and/or the client device generates a sequence of challenges $ch[j]+a_1$ through $ch[j]+a_L$ by increasing and/or decreasing the challenge $ch[j]+a_0$ by challenge coefficients $a_1$ through $a_L$. In an exemplary embodiment, the challenge coefficients $a_1$ through $a_L$ represent values stored in the counting circuitry 404 which is increased and/or decreased for each challenge from among the challenges $ch[j]+a_1$ through $ch[j]+a_L$. However, those skilled in the relevant art(s) will recognize that other challenge coefficients $a_1$ through $a_L$ are possible without departing from the spirit and scope of the present disclosure. For example, these other challenge coefficients $a_1$ through $a_L$ can represent coefficients of a mathematical polynomial, such as $a_1*x^L + a_2*x^{(L-1)} \ldots a_L$, or can be generated using a random, or pseudo-random, number generator. Finally, logical exclusive OR gates 402.1 through 402.L perform the logical exclusive OR operation between the messages $M_1$ through $M_L$ and their corresponding responses $R(ch[j]+a_0)$ through $R(ch[j]+a_L)$ to provide their corresponding encrypted information $C_1$ through $C_L$ as encrypted information 454. However, those skilled in the relevant art(s) will recognize that any combination of one or more logical OR gates, one or more logical AND gates, and one or more logical INVERTER gates can be used as an alternate, or in addition, to the logical exclusive OR gates 402.1 through 402.L without departing from the spirit and scope of the present disclosure. Those skilled in the relevant art(s) will recognize that this combination of logical gates performs a substantially similar function as the logical exclusive OR gates 402.1 through 402.L without departing from the spirit and scope of the present disclosure.

Exemplary Decrypting Processor

Figure 5:
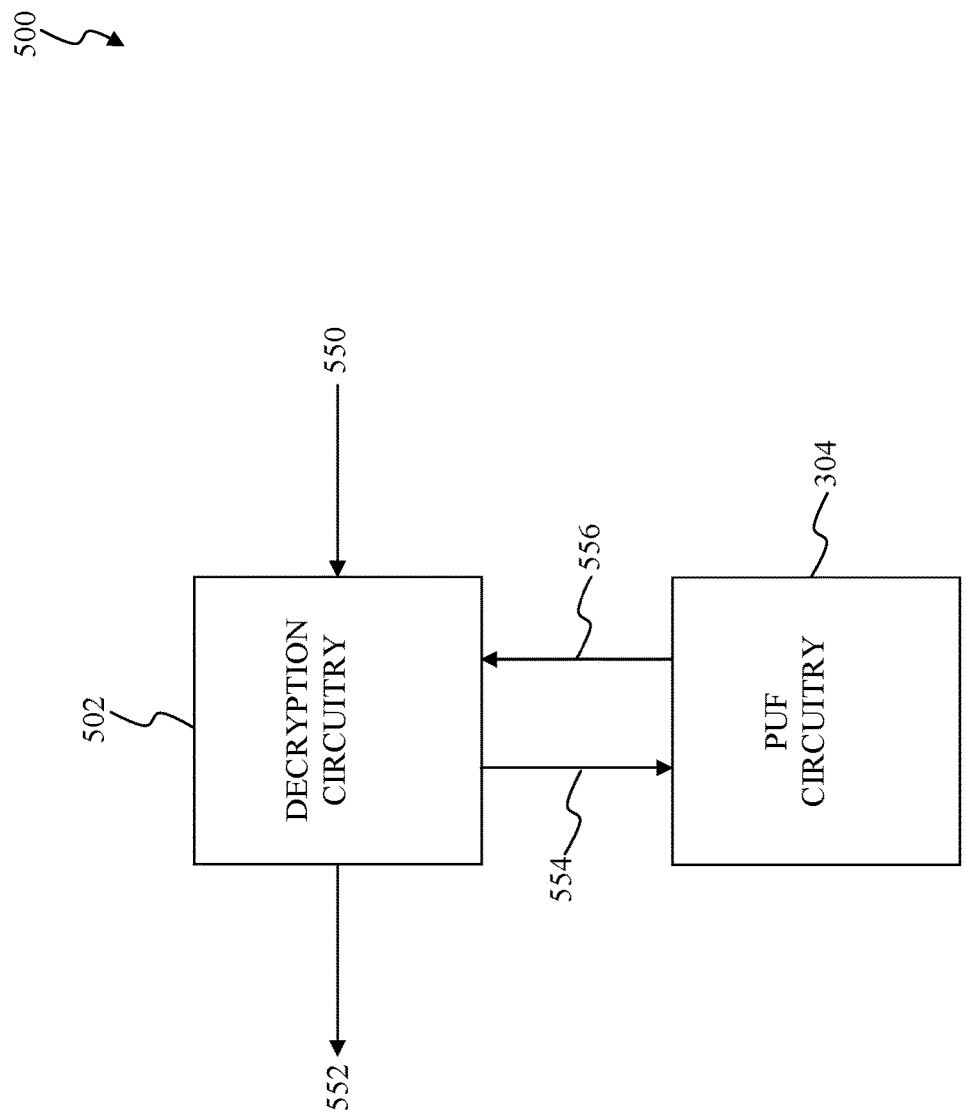
FIG. 5 is a block diagram of an exemplary decrypting processor that can be implemented within the exemplary client-server device communication system according to an embodiment of the present disclosure.

FIG. 5 is a block diagram of an exemplary decrypting processor that can be implemented within the exemplary client-server device communication system according to an embodiment of the present disclosure. A decrypting processor 500 decrypts encrypted information 550 in accordance with any of the one or more decryption algorithms as discussed above in FIG. 1 to provide information 552. The decrypting processor 500 can be implemented within a server device, such as server device 202, and/or a client device, such as one or more of client devices 204.1 through 204.n. In the exemplary embodiment illustrated in FIG. 5, decrypting processor 500 includes PUF circuitry 304 and decryption circuitry 502.

Referring to FIG. 5, decryption circuitry 502 queries PUF circuitry 304 with a challenge 554 and receives a response 556 in response to the challenge 554. When decrypting processor 500 is implemented within the client device, PUF circuitry 304 generates response 556 that represents a unique response of the client device that is dependent on the physical properties of PUF circuitry 304 in response to the challenge 554. Otherwise when decrypting processor 500 is implemented within the server device, PUF circuitry 304 provides a virtual mapping of one or more PUF circuitry, or portions thereof, of a client device from among client devices registered with the server device, such as one or more of PUF circuitry 208.1 through 208.n of client devices 204.1 through 204.n, as response 556. Thereafter, decryption circuitry 502 uses response 556 for one or more of the decryption algorithms to decrypt encrypted information 550 to provide information 552.

Figure 6:
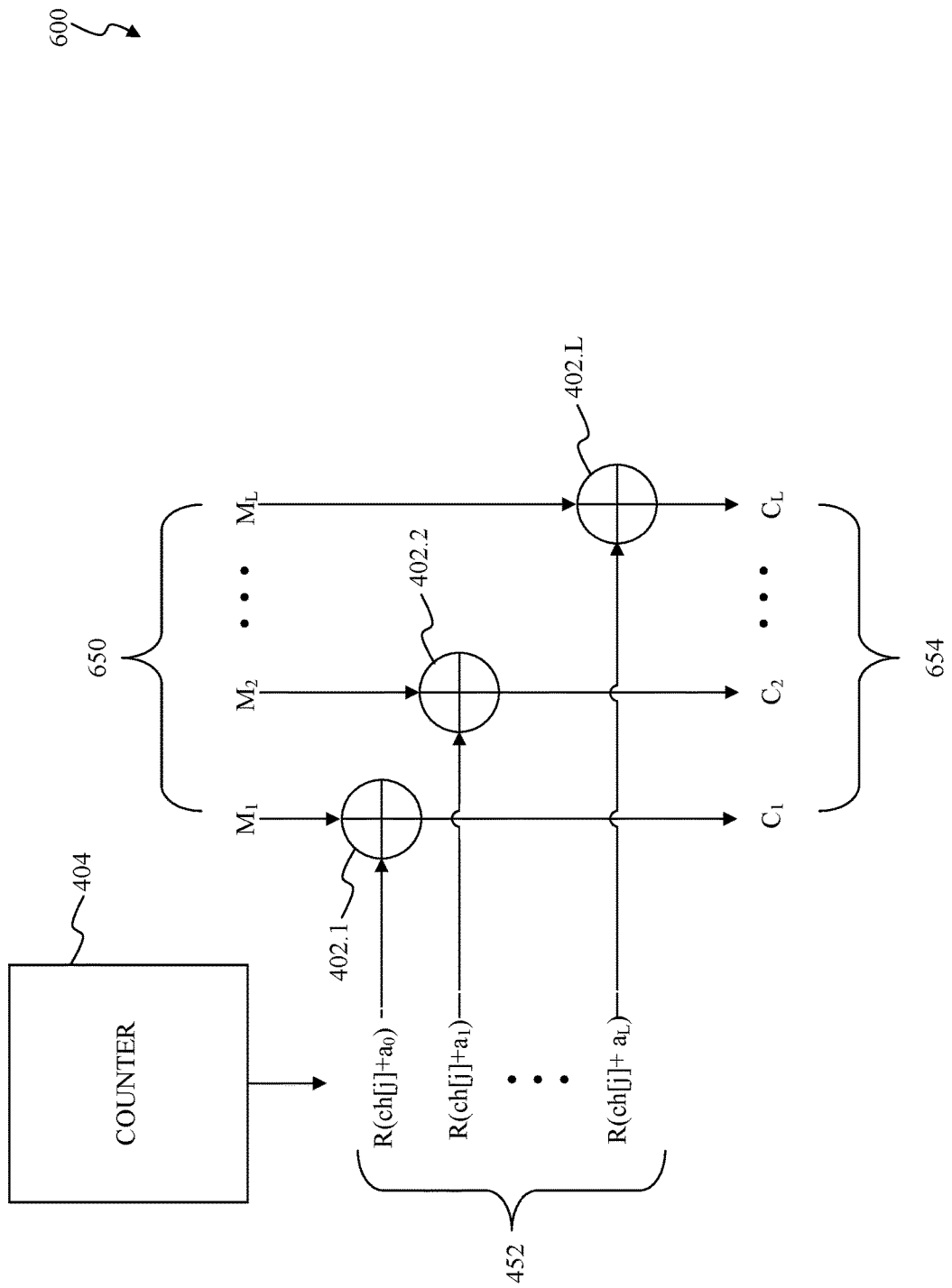
FIG. 6 is a block diagram of exemplary decrypting processing circuitry that can be implemented within the exemplary decrypting processor according to an embodiment of the present disclosure.

Exemplary Encrypting Processing Circuitry that can be Implemented within the Encrypting Processor FIG. 6 is a block diagram of exemplary decrypting processing circuitry that can be implemented within the exemplary decrypting processor according to an embodiment of the present disclosure. Decrypting processing circuitry 600 decrypts encrypted information 650 utilizing responses 452 to provide decrypted information 654. Decrypting processing circuitry 600 includes logical exclusive OR gates 402.1 through 402.L and counting circuitry 404. Decrypting processing circuitry 600 can represent an exemplary embodiment of decryption circuitry 502.

Decrypting processing circuitry 600 operates in a substantially similar manner as encrypting processing circuitry 400 described above in FIG. 4; therefore, only differences between decrypting processing circuitry 600 and encrypting processing circuitry 400 are discussed in further detail. In the exemplary embodiment of FIG. 6, encrypted information 650 can include an encrypted serial stream of video, audio, and/or data. As illustrated in FIG. 6, this encrypted serial stream of video, audio, and/or data can be logically separated into messages $M_1$ through $M_L$. The messages $M_1$ through $M_L$ can include a similar or a different number of bits and/or bytes, also referred to as bit-length, to one another. Logical exclusive OR gates 402.1 through 402.L perform the logical exclusive OR operation between the messages $M_1$ through $M_L$ and responses 452 to provide decrypted information 652 in a substantially similar manner as described in FIG. 4.

Figure 7:
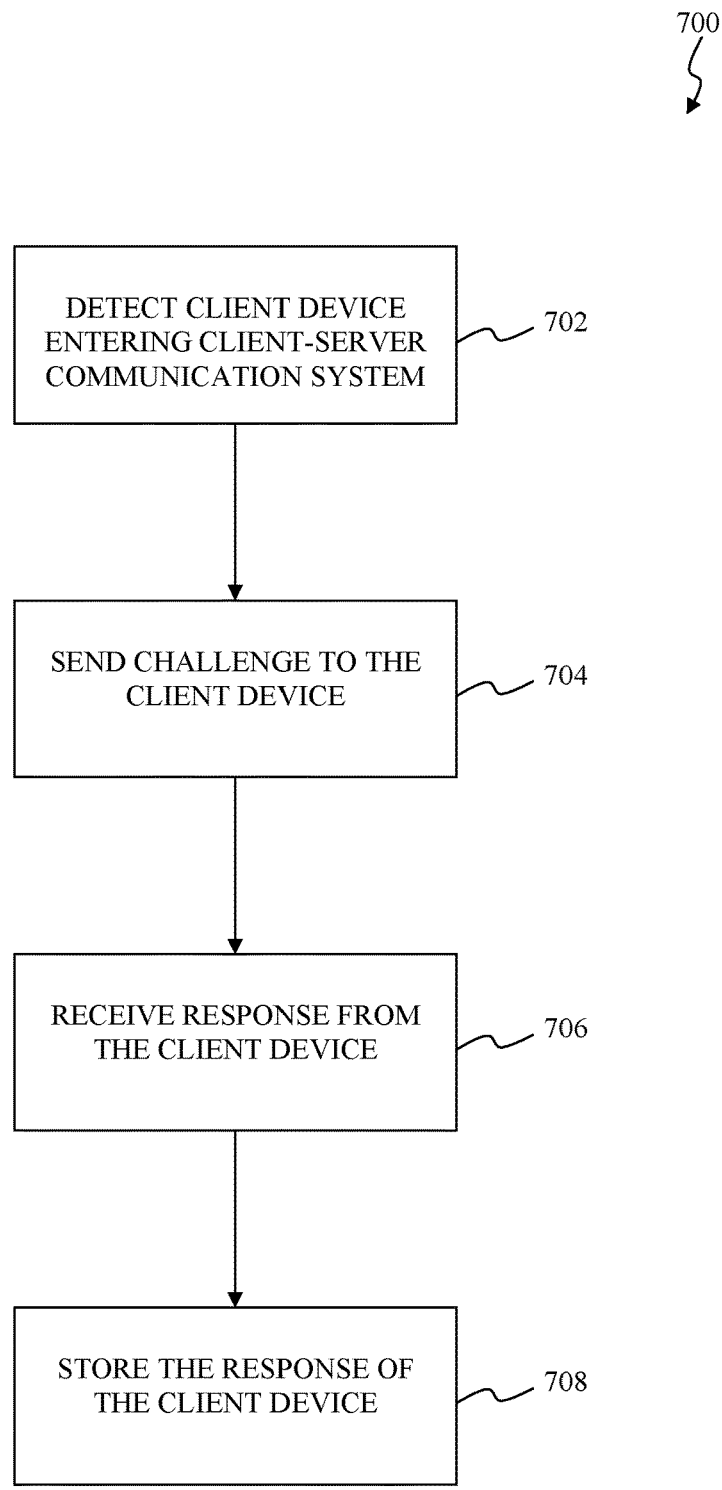
FIG. 7 is a flowchart of an exemplary operational control flow of a registration process to register one or more client devices with a server device according to an exemplary embodiment of the present disclosure.

Exemplary Registration Process for Client Devices within the Exemplary Client-Server Device Communication System FIG. 7 is a flowchart of an exemplary operational control flow of a registration process to register one or more client devices with a server device according to an exemplary embodiment of the present disclosure. The disclosure is not limited to this operational control flow. Rather, it will be apparent to persons of ordinary skill in the relevant art(s) that other operational control flows are within the scope and spirit of the present disclosure. Described below is an exemplary operational control flow 700 of a registration process of a server device, such as server device 202, to register a client device, such as one of client devices 204.1 through 204.n, in a client-server device communication system, such as client-server device communication system 200.

At operation 702, operational control flow 700 detects the client device entering the client-server device communication system. For example, operational control flow 700 can receive a request from the client device to associate the client device with the server device. In an exemplary embodiment, the request can include identifying information of the client device, such as a Media Access Control (MAC) address of the client device or a device identification (ID) representing a unique number associated with the client device, that is used by operational control flow 700 to identify the device.

At operation 704, operational control flow 700 sends a challenge to the client device of operation 702. The challenge can represent a request to access information stored in a PUF circuitry, such as one of PUF circuitry 208.1 through 208.n, of the client device of operation 702. The challenge can request all, or some, of the information stored in the PUF circuitry.

At operation 706, operational control flow 700 receives a response from the client device of operation 702 in response to the challenge of 702. The client device of operation 702 queries the PUF circuitry using the challenge of operation 702. When the PUF circuitry is presented with the challenge of operation 702, the PUF circuitry generates a random response that depends on the physical properties of the PUF circuitry. Operational control flow 700 receives this random response as the response from the client device of operation 702.

At operation 708, operational control flow 700 stores the response of operation 706. Operational control flow 700 catalogs the response of operation 706 along with other responses of other client devices to virtually map their PUF circuitry to generate a virtual PUF circuitry storage device as described above in FIG. 2. Operational control flow 700 can store these responses in the virtual PUF circuitry storage device as one or more listings, one or more tables, one or more files, one or more databases, and/or any other well-known storage type that will be apparent to those skilled in the relevant art(s) without departing from the spirit and scope of the present disclosure. In some situations, operational control flow 700 stores these responses along with their corresponding challenges as challenge-response pairs in the virtual PUF circuitry storage device. These challenge-response pairs stored in the virtual PUF circuitry storage device can be indexed to the identifying information of operation 702.

CONCLUSION

The foregoing Detailed Description discloses a server device within a client-server device communication system.

The server device includes PUF circuitry and encryption circuitry. The PUF circuitry stores a virtual mapping of multiple PUF circuitry of multiple client devices within the client-server device communication system. The encryption circuitry queries the PUF circuitry with a first challenge for a first response from among the virtual mapping corresponding to a client device from among the multiple client devices, generates a second challenge by increasing or decreasing the first challenge by a challenge coefficient, and queries the PUF circuitry with the second challenge for a second response from among the virtual mapping corresponding to the client device. The encryption circuitry includes a first logical gate configured to perform a logical operation between a first message from among multiple messages and the first response to provide a first encrypted message and a second logical gate that performs the logical operation between a second message from among the multiple messages and the second response to provide a second encrypted message.

The foregoing Detailed Description also discloses a method for operating a server device within a client-server device communication system. The method includes: storing a virtual mapping of multiple PUF circuitry of multiple client devices within the client-server device communication system, querying the PUF circuitry with a first challenge for a first response from among the virtual mapping corresponding to a client device from among the multiple client devices, generating a second challenge by increasing or decreasing the first challenge by a challenge coefficient, querying the PUF circuitry with the second challenge for a second response from among the virtual mapping corresponding to the client device, and performing a logical operation between a first message from among multiple messages and the first response to provide a first encrypted message and between a second message from among the multiple messages and the second response to provide a second encrypted message.

The foregoing Detailed Description further discloses another server device of a client-server device communication system. The other server device includes PUF circuitry and encryption circuitry. The PUF circuitry stores multiple responses received from multiple client devices, each of the multiple responses being received in response to a first challenge provided by the server device to read multiple PUF circuitry of the multiple client devices. The encryption circuitry queries the PUF circuitry with a second challenge for a first response from among the multiple responses corresponding to a client device from among the multiple client devices, generates a third challenge by increasing or decreasing the second challenge by a challenge coefficient, queries the PUF circuitry with the third challenge for a second response from among the multiple responses corresponding to the client device, utilizes the first response as a first seed to an encryption algorithm to encrypt a first message from among multiple messages, and utilizes the second response as a second seed to the encryption algorithm to encrypt a second message from among the multiple messages.

The foregoing Detailed Description outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A server device within a client-server device communication system, the server device comprising:
    a virtual physical unclonable function (PUF) circuitry storage device that stores a virtual mapping of a plurality of PUF circuitries of a plurality of client devices within the client-server device communication system; and
    encryption circuitry configured to:
        query the virtual PUF circuitry storage device with a first challenge for a first response from among the virtual mapping corresponding to a client device from among the plurality of client devices,
        generate a second challenge by increasing or decreasing the first challenge by a challenge coefficient, and
        query the virtual PUF circuitry storage device with the second challenge for a second response from among the virtual mapping corresponding to the client device, and
    wherein the encryption circuitry comprises:
        a first logical gate configured to perform a logical operation between a first message from among a plurality of messages and the first response to provide a first encrypted message, and
        a second logical gate configured to perform the logical operation between a second message from among the plurality of messages and the second response to provide a second encrypted message.

2. The server device of claim 1, wherein the server device is configured to provide the first encrypted message and the second encrypted message to the client device.

3. The server device of claim 1, wherein the server device is configured to:
    query a second PUF circuitry of the client device with a third challenge for a third response, and
    wherein the virtual PUF circuitry storage device is configured to store the third response as part of the virtual mapping of the plurality of PUF circuitries.

4. The server device of claim 3, wherein the third challenge represents a request to read information corresponding to a plurality of memory cells from the second PUF circuitry which is read from the plurality of memory cells by the second PUF circuitry when the plurality of memory cells is operating in an unprogrammed mode of operation.

5. The server device of claim 1, wherein the virtual mapping of the plurality of PUF circuitries comprises:
    a listing, a table, a file, or a database of a plurality of challenge-response pairs of the plurality of client devices.

6. The server device of claim 5, wherein the listing, the table, the file, or the database of the plurality of challenge-response pairs is indexed to identifying information corresponding to the plurality of client devices.

7. The server device of claim 1, wherein the encryption circuitry further comprises:
    counting circuitry, and
        wherein the encryption circuitry is configured to generate the second challenge by increasing or decreasing the first challenge by a value stored in the counting circuitry.

8. The server device of claim 1, wherein a bit-length of the first response is equal to a bit-length of the first message.

9. The server device of claim 1, wherein the first logical gate comprises:
   a first exclusive OR gate configured to perform a logical exclusive OR operation between the first message and the first response to provide the first encrypted message, and
wherein the second logical gate comprises:
   a second exclusive OR gate configured to perform the logical exclusive OR operation between the second message and the second response to provide the second encrypted message.

10. A method for operating a server device within a client-server device communication system, the method comprising:
   storing a virtual mapping of a plurality of physical unclonable function (PUF) circuitries of a plurality of client devices within the client-server device communication system;
   querying, using a first challenge, for a first response from among the virtual mapping corresponding to a client device from among the plurality of client devices;
   generating a second challenge by increasing or decreasing the first challenge by a challenge coefficient;
   querying, using the second challenge, for a second response from among the virtual mapping corresponding to the client device; and
   performing a logical operation between a first message from among a plurality of messages and the first response to provide a first encrypted message and between a second message from among the plurality of messages and the second response to provide a second encrypted message.

11. The method of claim 10, further comprising:
   providing the first encrypted message and the second encrypted message to the client device.

12. The method of claim 10, further comprising:
   querying a second PUF circuitry of the client device with a third challenge for a third response, and
   wherein the storing comprises:
      storing the third response as part of the virtual mapping of the plurality of PUF circuitries.

13. The method of claim 12, wherein the third challenge represents a request to read information corresponding to a plurality of memory cells from the second PUF circuitry which is read from the plurality of memory cells by the second PUF circuitry when the plurality of memory cells is operating in an unprogrammed mode of operation.

14. The method of claim 10, wherein the storing comprises:
   storing the virtual mapping of the plurality of PUF circuitries as a listing, a table, a file, or a database of a plurality of challenge-response pairs of the plurality of client devices.

15. The method of claim 14, wherein the storing further comprises:
   indexing the listing, the table, the file, or the database of the plurality of challenge-response pairs to identifying information corresponding to the plurality of client devices.

16. The method of claim 10, wherein the generating comprises:
   generating the second challenge by increasing or decreasing the first challenge by a value stored in counting circuitry.

17. The method of claim 10, wherein a bit-length of the first response is equal to a bit-length of the first message.

18. The method of claim 10, wherein the performing comprises:
   performing a logical exclusive OR operation between the first message and the first response to provide the first encrypted message and between the second message and the second response to provide the second encrypted message.

19. A server device of a client-server device communication system, the server device comprising:
   a virtual physical unclonable function (PUF) circuitry storage device that stores a plurality of responses received from a plurality of client devices, each of the plurality of responses being received in response to a first challenge provided by the server device to read a plurality of PUF circuitries of the plurality of client devices; and
   encryption circuitry configured to:
      query the virtual PUF circuitry storage device with a second challenge for a first response from among the plurality of responses corresponding to a client device from among the plurality of client devices,
      generate a third challenge by increasing or decreasing the second challenge by a challenge coefficient,
      query the virtual PUF circuitry storage device with the third challenge for a second response from among the plurality of responses corresponding to the client device,
      utilize the first response as a first seed to an encryption algorithm to encrypt a first message from among a plurality of messages, and
      utilize the second response as a second seed to the encryption algorithm to encrypt a second message from among the plurality of messages.

20. The server device of claim 19, wherein the virtual PUF circuitry storage device stores the plurality of responses as a listing, a table, a file, or a database of a plurality of challenge-response pairs of the plurality of client devices.

21. The server device of claim 20, wherein the listing, the table, the file, or the database of the plurality of challenge-response pairs is indexed to identifying information corresponding to the plurality of client devices.

22. The server device of claim 19, wherein the encryption circuitry comprises:
   counting circuitry, and
   wherein the encryption circuitry is configured to generate the second challenge by increasing or decreasing the first challenge by a value stored in the counting circuitry.

* * * * *